(12) United States Patent
Schleyer et al.

(10) Patent No.: US 11,270,434 B2
(45) Date of Patent: Mar. 8, 2022

(54) MOTION CORRECTION FOR MEDICAL IMAGE DATA

(71) Applicant: Siemens Medical Solutions USA, Inc., Malvern, PA (US)

(72) Inventors: Paul Schleyer, Knoxville, TN (US); Sebastian Fuerst, Knoxville, TN (US); Matthew Mitchell, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 16/947,666

(22) Filed: Aug. 12, 2020

(65) Prior Publication Data

US 2021/0104037 A1 Apr. 8, 2021

Related U.S. Application Data

(60) Provisional application No. 62/911,460, filed on Oct. 7, 2019.

(51) Int. Cl.
| | |
|---|---|
| *G06T 7/00* | (2017.01) |
| *G06T 5/00* | (2006.01) |
| *G06T 7/11* | (2017.01) |
| *G06V 10/25* | (2022.01) |
| *G06V 10/62* | (2022.01) |

(52) U.S. Cl.
CPC .......... *G06T 7/0012* (2013.01); *G06T 5/003* (2013.01); *G06T 7/11* (2017.01); *G06V 10/25* (2022.01); *G06T 2207/10104* (2013.01); *G06T 2207/20081* (2013.01); *G06T 2207/30004* (2013.01); *G06V 10/62* (2022.01)

(58) Field of Classification Search
CPC ......... G06T 7/0012; G06T 5/003; G06T 7/11; G06T 2207/20081; G06T 2207/10104; G06T 2207/30004; G06K 9/3233; G06K 2009/3291; G06K 2209/051; G06V 10/25; G06V 2201/031; G06V 10/62
See application file for complete search history.

(56) References Cited

U.S. PATENT DOCUMENTS

| | | | | |
|---|---|---|---|---|
| 2007/0116172 | A1* | 5/2007 | Hsieh | A61B 6/032 378/8 |
| 2009/0204003 | A1* | 8/2009 | Guracar | G01S 15/8981 600/458 |
| 2012/0078089 | A1* | 3/2012 | Wollenweber | A61B 6/037 600/427 |
| 2016/0358334 | A1* | 12/2016 | Osborne | A61B 6/5264 |
| 2019/0080456 | A1* | 3/2019 | Song | G06T 7/174 |
| 2019/0362497 | A1* | 11/2019 | Dwivedi | G06T 7/12 |

* cited by examiner

*Primary Examiner* — Jon Chang

(57) ABSTRACT

A framework for motion correction in medical image data. In accordance with one aspect, one or more anatomical ranges where motion is expected are identified in a localizer image of a subject. Image reconstruction with motion correction may be performed based on medical image data within the one or more anatomical ranges to generate motion corrected image data. The motion corrected image data may then be combined with non-motion corrected image data to generate final image data.

20 Claims, 5 Drawing Sheets

MOTION CORRECTION FOR MEDICAL IMAGE DATA

CROSS-REFERENCE TO RELATED APPLICATION

The present application claims the benefit of U.S. provisional application No. 62/911,460 filed Oct. 7, 2019, the entire contents of which are herein incorporated by reference.

TECHNICAL FIELD

The present disclosure generally relates to image data processing, and more particularly to a framework for motion correction for medical image data.

BACKGROUND

Modern positron emission tomography (PET) imaging techniques have led to widespread use of PET, including in oncology, neuroimaging, cardiology, and pharmacology. However, PET image data often suffers from image degradation due to subject motion during the PET image data acquisition. PET acquisition requires scans of long durations, and a significant magnitude of subject motion during the scan is sometimes unavoidable. Motion can occur due to normal breathing, heartbeat, and gross subject movement during the image acquisition. Among the different types of motion, respiratory motion typically has the largest impact on thoracic and abdomen imaging due to its large magnitude and the larger variation of breathing patterns.

Respiratory motion correction methods are available for PET imaging. However, such motion correction methods are typically computationally intensive. As such, it is not desirable to perform motion correction on regions which are known not to move. Moreover, applying motion correction unnecessarily can, in some cases, introduce unwanted noise.

To define which anatomical regions to correct for motion, the operator manually selects bed positions, or an axial range in the case of continuous bed motion. This manual process is time-consuming and operator-dependent. In addition, where hardware is used to measure the respiratory signal of the subject during imaging, a specific motion correction imaging protocol must be followed in order to facilitate motion correction. This process is complicated and the specific workflow potentially limits widespread use of respiratory motion correction for PET.

SUMMARY

Described herein is a framework for motion correction in medical image data. In accordance with one aspect, one or more anatomical ranges where motion is expected are identified in a localizer image of a subject. Image reconstruction with motion correction may be performed based on medical image data within the one or more anatomical ranges to generate motion corrected image data. The motion corrected image data may then be combined with non-motion corrected image data to generate final image data.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
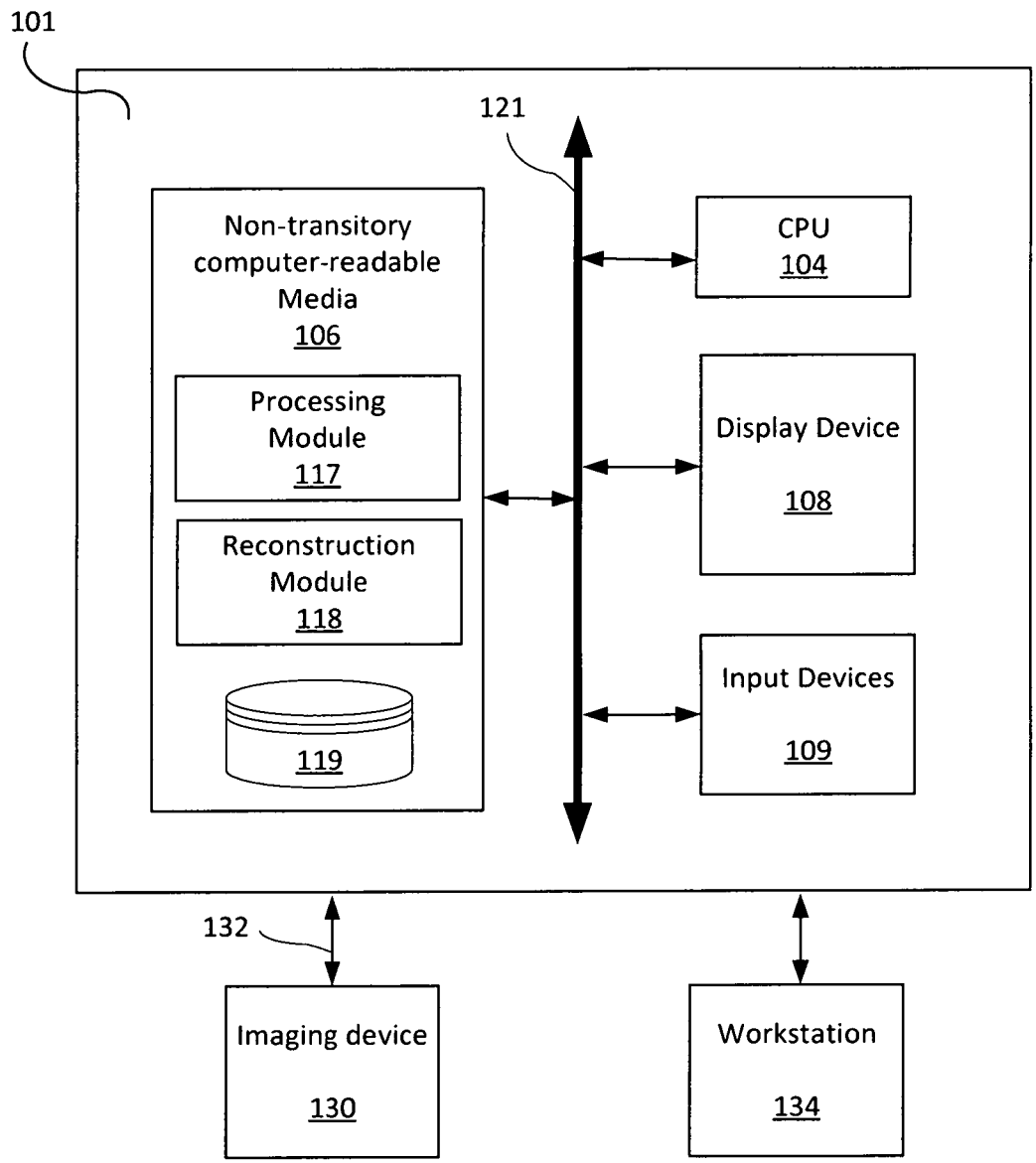
FIG. 1 shows a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

A framework for automated motion correction is presented herein. In accordance with one aspect, the framework automatically defines the anatomical range (e.g., axial range) in which motion correction is applied. When combined with data-driven methods for motion correction, the framework seamlessly integrates motion correction of relevant anatomical regions into the standard, non-motion corrected clinical imaging protocol which requires no user interaction. No prior-selection of subjects who require motion correction is required to facilitate motion correction. No additional hardware may be required to measure the respiratory state of the patient during acquisition. Motion correction is simply produced as an additional reconstruction of a standard acquisition (e.g., standard whole or half body PET image data acquisition). These and other exemplary advantages and features will be described in more detail in the following description.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as imaging device 130 and workstation 134. In a networked deployment, computer system 101 may operate in the capacity of a server (e.g., in a server-client user network environment, a client user machine in server-client user network environment, or as a peer machine in a peer-to-peer (or distributed) network environment.

In one implementation, computer system 101 includes a processor device or central processing unit (CPU) 104 coupled to one or more non-transitory computer-readable media 106 (e.g., computer storage or memory device), display device 108 (e.g., monitor) and various input devices 109 (e.g., mouse, touchpad or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in one or more non-transitory computer-readable media 106. In particular, the present techniques may be implemented by a processing module 117 and a reconstruction module 118. Non-transitory computer-readable media 106 may include random access memory (RAM), read-only memory (ROM), magnetic floppy disk, flash memory, and other types of memories, or a combination thereof. The computer-readable program code is executed by CPU 104 to process data provided by, for example, database 119 and/or imaging device 130. As such, the computer system 101 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein. The same or different computer-readable media 106 may be used for storing a database 119, including, but not limited to, image datasets, a knowledge base, individual subject data, medical records, diagnostic reports (or documents) for subjects, or a combination thereof.

Imaging device 130 acquires medical image data 132 associated with at least one subject. Such medical image data 132 may be processed and stored in database 119. Imaging device 130 may be a radiology scanner (e.g., nuclear medicine scanner) and/or appropriate peripherals (e.g., keyboard and display device) for acquiring, collecting and/or storing such medical image data 132. Medical image data 132 may be acquired from a subject by using techniques such as high-resolution computed tomography (HRCT), magnetic resonance (MR) imaging, computed tomography (CT), helical CT, X-ray, angiography, positron emission tomography (PET), fluoroscopy, ultrasound, single photon emission computed tomography (SPECT), or a combination thereof. Imaging device 130 may be a hybrid modality designed for the simultaneous recording of, for example, CT and PET data.

The workstation 134 may include a computer and appropriate peripherals, such as a keyboard and display device, and can be operated in conjunction with the entire system 100. For example, the workstation 134 may communicate with imaging device 130 so that the medical image data 132 from imaging device 130 can be presented or displayed at the workstation 134. The workstation 134 may communicate directly with the computer system 101 to display processed data and/or output results. The workstation 134 may include a graphical user interface to receive user input via an input device (e.g., keyboard, mouse, touch screen voice or video recognition interface, etc.) to manipulate visualization and/or processing of the data.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
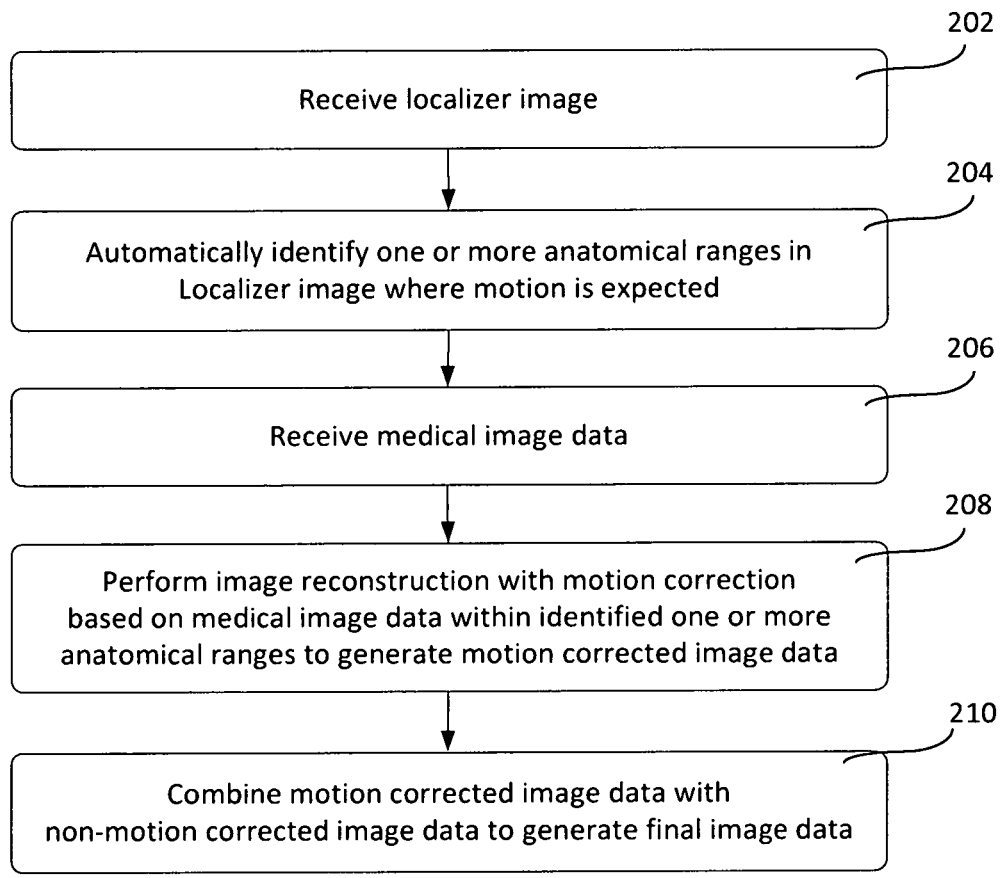
FIG. 2 shows an exemplary method performed by a computer system.

FIG. 2 shows an exemplary method 200 performed by a computer system. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, processing module 117 receives a localizer image of a subject. The localizer image is acquired by, for example, imaging device 130 or other imaging device before the detailed medical image data of the subject (e.g., patient) is acquired. The localizer image may be a preliminary scanogram, topogram, scout image, pilot scan, survey scan or any image that establishes a dimensionally accurate representation of the subject being scanned. The localizer image may be used to establish the anatomical range in which motion is expected. The localizer image may be relatively low resolution and acquired relatively quickly without sophisticated three-dimensional rendering and with minimal exposure to ionizing radiation. For example, the localizer image may be a CT projection image and appear similar to a radiograph, where the outline of the subject's body may be seen with certain organs and anatomical features superimposed thereon. The localizer image may also be acquired by other modalities, including, but not limited to, a radiological scanner (e.g., PET) or a non-radiological scanner, such as a three-dimensional (3D) imager, optical (e.g., red-green-blue depth) camera, radar camera or a visible structured-light 3D scanner.

At 204, processing module 117 automatically identifies one or more anatomical ranges in the localizer image where motion by the subject is expected. Subject motion may include substantially periodic motion (e.g., respiratory or cardiac motion) or non-periodic motion (e.g., brain, stomach or bowel system motion). Each anatomical range coincides with a region of interest (ROI) where substantial movement of the subject is expected. An ROI may be defined by a few well-known anatomical landmarks. For example, the ROI (and thus the anatomical range) for respiratory motion may range from the upper pubis to the clavicle of the subject. The ROI for cardiac motion may range over the left ventricle of the subject, while the ROI for head motion may range over the brain of the subject. Other anatomical ranges may also be defined. The anatomical range may have boundaries that are parallel and perpendicular to the sides of the localizer image, or the anatomical range may be slanted. The anatomical range may be defined by, for example, an axial range. The anatomical range may be fully contained within the localizer image, or partially out of view.

Figure 3:
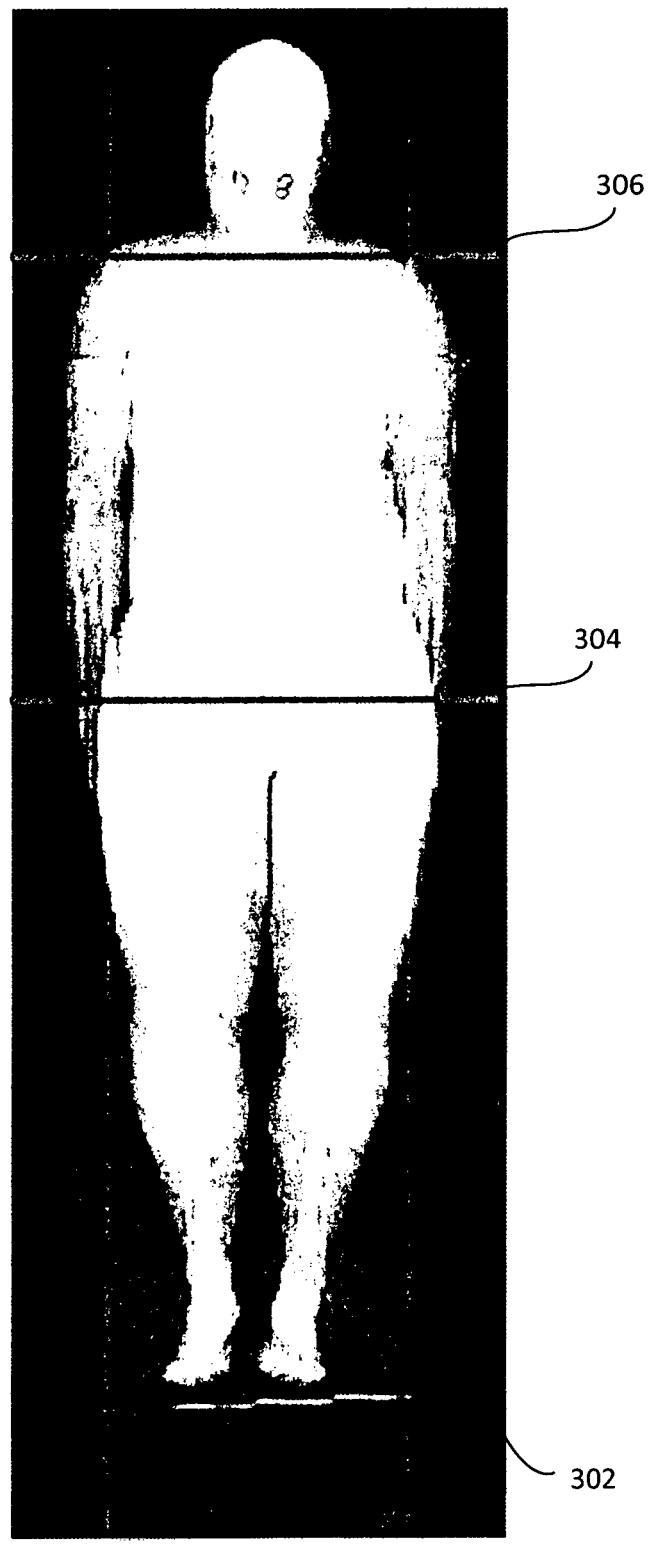
FIG. 3 shows an exemplary localizer image of a human subject.

FIG. 3 shows an exemplary localizer image 302 of a human subject. The identified anatomical range is defined by a lower limit line 304 representing the bladder and an upper limit line 306 that represents the lung apex. The identified anatomical range represents the region where respiratory motion is expected. It should be appreciated that although only one anatomical range is illustrated, there may also be multiple anatomical ranges for different types of motions (e.g. respiratory motion, cardiac motion and/or brain motion).

In some implementations, the medical practitioner may input the desired organs and/or other anatomical structures that are to be treated as ROIs where motion is expected. This selection of ROIs may occur prior to the acquisition of the localizer image where it is desired that the length of time between the acquisition of the localizer image and the acquisition of the medical image data be minimized. However, it may also be possible to select the desired ROIs after the localizer image is acquired. To automatically find the ROI, and thus the anatomical range, in the localizer image, a learning-based algorithm based on aggregation of learned local appearance cues may be used. See, for example, Y. Tao, Z. Peng, A. Krishnan and X. S. Zhou, "Robust Learning-Based Parsing and Annotation of Medical Radiographs," in *IEEE Transactions on Medical Imaging*, vol. 30, no. 2, pp. 338-350, February 2011, which is herein incorporated by reference. Other types of methods may also be applicable.

Returning to FIG. 2, at 206, reconstruction module 118 receives medical image data 132 of the subject. The medical image data 132 may be acquired by, for example, imaging device 130. In some implementations, the medical image data is acquired by a half- or whole-body positron emission tomography (PET) scan. Other types of medical image data obtained using other imaging modalities, such as high-resolution computed tomography (HRCT), magnetic resonance (MR) imaging, computed tomography (CT), helical CT, X-ray, angiography, fluoroscopy, ultrasound, single photon emission computed tomography (SPECT) or a combination thereof, may also be acquired. The medical image data may be acquired in, for example, list-mode time-of-flight data format. Other types of data formats are also useful.

At 208, reconstruction module 118 performs image reconstruction with motion correction based only on medical image data within the one or more anatomical ranges identified by processing module 117 to generate motion corrected image data. The medical image data may be divided into one or more first and second subsets. The first subset includes only medical image data within the one or more anatomical ranges. The second subset includes only medical image data outside the one or more anatomical ranges. Motion corrected image data may be generated based on the one or more first subsets of image data by performing an image reconstruction algorithm that compensates for motion using motion estimation techniques. Depending on the type of motion to be corrected, the motion estimation techniques may include rigid-body transformations (e.g., for brain motion) or elastic motion correction (e.g., for respiratory or cardiac motion).

Figure 4:
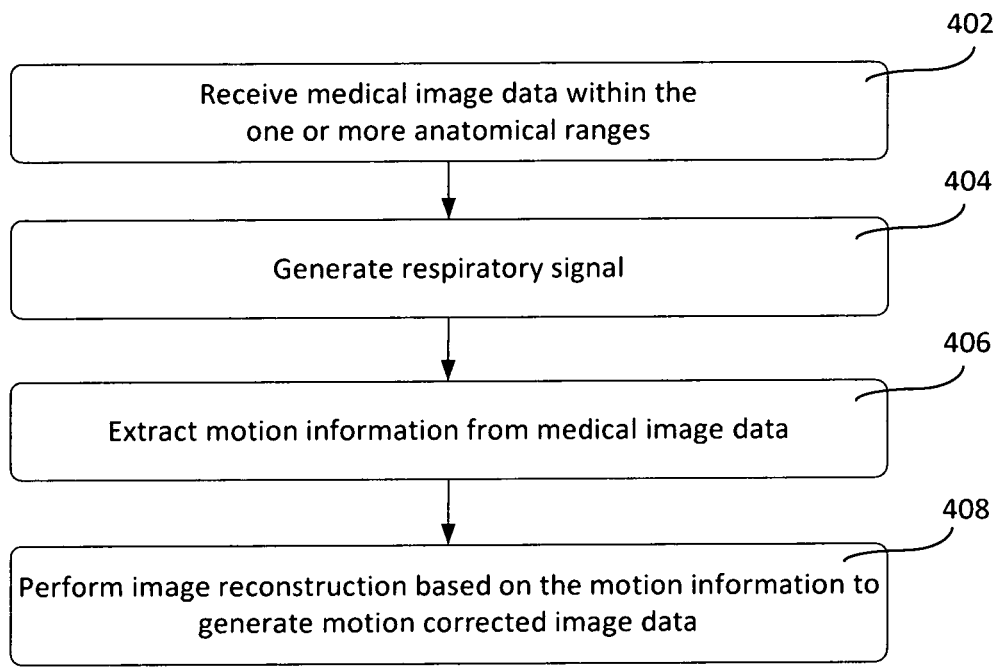
FIG. 4 shows an exemplary method of image reconstruction with motion correction.

FIG. 4 shows an exemplary method 400 of image reconstruction with motion correction. It should be understood that the steps of the method 400 may be performed in the order shown or a different order. Additional, different, or fewer steps may also be provided. Further, the method 400 may be implemented with the system 100 of FIG. 1, a different system, or a combination thereof.

At 402, reconstruction module 118 receives the one or more first subsets of medical image data that is within the identified one or more anatomical ranges.

At 404, reconstruction module 118 generates a respiratory signal. The respiratory signal tracks respiratory motion during medical image data acquisition. The respiratory signal may be extracted from the medical image data itself by using a data-driven respiratory gating technique. For example, the periodic motion of the radioactivity within the patient, attributable to respiration, can be extracted from either the PET raw data (e.g. from a time series of short-duration sinograms) or from PET images (e.g. from a time series of short-duration PET images). See, for example, Schleyer P, Hong I, Jones J, Hamill J, Panin V, and Fuerst S, *Data-driven respiratory gating whole body PET using continuous bed motion*. Conf. proceed. IEEE MIC 2018, Sydney, Australia, which is herein incorporated by reference. There is advantageously no set-up time involved for such respiratory gating technique, as no external system or tool is attached to the patient to measure the respiratory state of the patient during image acquisition.

In some implementations, as the bed moves continuously through the scanner gantry, a data-driven respiratory signal is extracted from different intensities and distributions of moving activity at different locations within the anatomical range. The data-driven respiratory gating technique may first convert listmode time-of-flight PET data to a time series of spatially filtered histo-projection volumes. An initial estimate of the respiratory signal may be obtained by calculating the time-varying anterior-posterior (AP) displacement. The full anatomical range may then be divided into a series of overlapping short axial regions and processed with a data-driven gating method based on spectral analysis, initialized with spectral information from the AP signal. A volumetric (or 3D) mask that identifies regions in the histo-projection volumes that are subject to respiratory motion may then be produced. By multiplying the mask with each histo-projection volume and summing over all spatial dimensions, a one-dimensional time series that represents respiratory amplitude may be produced. An optimization process may be used to combine the axial regions and produce a consistent relationship between the physical direction of motion and the respiratory signal polarity throughout the anatomical range.

At 406, reconstruction module 118 extracts motion information from the one or more first subsets of medical image data within the one or more anatomical ranges. The respiratory signal may be used to separate the medical image data into gates (or sets of images) corresponding to the phases or amplitudes of the respiration cycle indicated by the respiratory signal. Each gate represents a part of the respiration cycle, so that medical image data subjected to similar motion or location shift is grouped together. Motion information may then be extracted from the gated image data.

In some implementations, the motion information is estimated by generating a motion blurring kernel based on at least one of the gates to model elastic motion information. The motion blurring kernel may be derived from a reference image (e.g., uncorrected gate) to a static (e.g., motion blurred, ungated) image using mass-preserving optical flow. See, for example, Hong I, Jones J, Casey M, *Ultrafast elastic motion correction via motion deblurring*, IEEE Nuclear Science Symposium and Medical Imaging Conference (NSS/MIC), 2014, which is herein incorporated by reference. Other types of techniques for estimating and correcting for motion are also useful. For example, instead of using only one gate to generate the motion blurring kernel, motion information may be extracted from multiple reconstructed gated images to correct the images. The corrected reconstructed images may then be summed or averaged to produce a single motion corrected image. Alternatively, the motion information estimation and correction process may be entirely incorporated in the reconstruction method.

At 408, reconstruction module 118 performs image reconstruction of the medical image data based on the motion information to generate motion corrected image data. In some implementations, image reconstruction generates three-dimensional cartesian-coordinate (spatial) reconstructed image volumes from multi-dimensional raw medical image data (e.g., projection data). The output image data may also be four-dimensional in the case of gated or dynamic images. The reconstructed image data may represent activity concentration (e.g. kBq/ml). Alternatively, direct parametric reconstruction may be performed to reconstruct image data that represents a kinetic parameter, such as the Patlak Ki parameter. Motion correction may produce a single image with no motion blur, but with similar noise characteristics to the non-corrected image. Other reconstruction techniques, such as analytical methods (e.g., discrete Fourier inverse transform (DIFT) and filtered backprojection (FBP)), may also be applied.

The image reconstruction may be, for example, an iterative reconstruction process that incorporates the motion information (e.g., motion blurring kernel). Other types of image reconstruction techniques may also be used. For example, a reconstruct, register and add approach may be applied, whereby motion information is extracted from multiple reconstructed gated images, as previously described. In such approach, each gate of medical image data is first reconstructed. Motion correction may then be performed by registering each gate to a reference gate. All registered and reconstructed gates may then be combined into a single motion corrected image. Alternatively, a motion compensated image reconstruction approach may be used. In such approach, motion correction is performed during the iterative reconstruction process itself to reconstruct separate gates into a single, motion corrected image.

In some implementations, during iterative reconstruction, the motion blurring kernel is used to make elastic motion corrections before forward projection to generate motion blurred image. Forward projection may then be performed on the motion blurred image. The transpose of motion blurring may be performed after backprojection. See, for example, Hong I, Jones J, Casey M, *Ultrafast elastic motion correction via motion deblurring*, IEEE Nuclear Science Symposium and Medical Imaging Conference (NSS/MIC), 2014, which is herein incorporated by reference. Other types of image reconstruction techniques may also be used.

Returning to FIG. 2, at 210, reconstruction module 118 combines (or stitches) the motion corrected image data with non-motion corrected reconstructed image data to generate the final image data. The non-motion corrected reconstructed image data may be generated by performing image reconstruction without motion correction on the one or more second subsets of medical image data outside the one or more anatomical ranges identified by processing module 117. Image reconstruction performed without compensating for motion correction generally requires less time and computing resources than image reconstruction with motion correction. Exemplary image reconstruction techniques include, but are not limited to, iterative reconstruction techniques, analytical methods (e.g., discrete Fourier inverse transform (DIFT) and filtered backprojection (FBP)) and direct parametric reconstruction.

Figure 5:
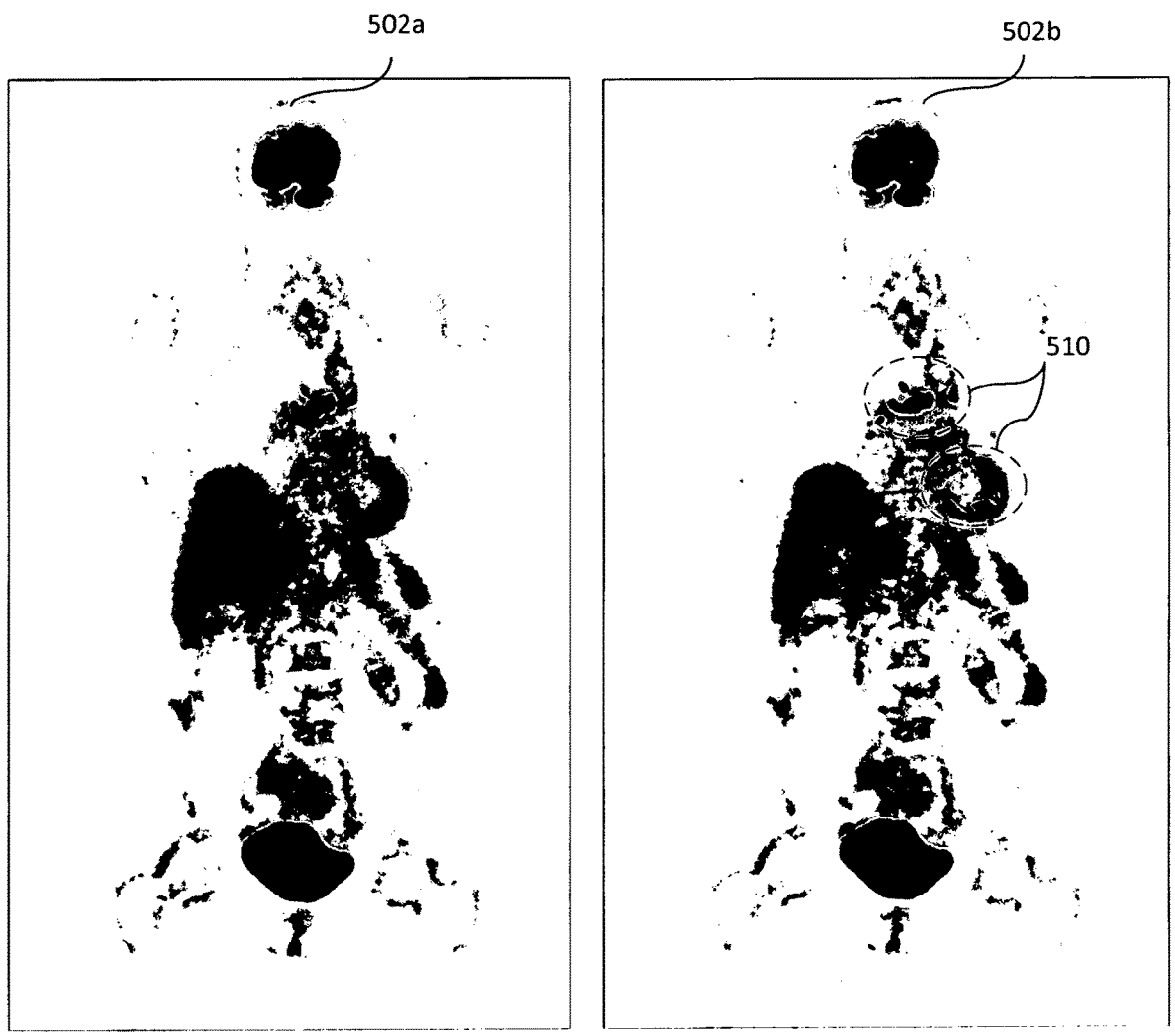
FIG. 5 shows an exemplary non-motion corrected PET image and an exemplary motion corrected PET image.

FIG. 5 shows an exemplary non-motion corrected PET image 502a and an exemplary motion corrected PET image 502b. Motion corrected image 502b was reconstructed using the present framework. Significant deblurring is shown in regions 510 of the motion corrected image 502b.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A motion correction system, comprising:
a non-transitory memory device for storing computer readable program code; and
a processor in communication with the memory device, the processor being operative with the computer readable program code to perform steps including
selecting, prior to acquisition of a localizer image of a subject, one or more regions of interest where motion is expected,
identifying one or more anatomical ranges that coincide with the one or more regions of interest in the localizer image,
acquiring a set of medical image data of the subject and dividing the set of medical image data into first and second subsets, wherein the first subset includes only medical image data within the one or more anatomical ranges and the second subset includes only medical image data outside the one or more anatomical ranges,
performing image reconstruction with motion correction based on the first subset to generate motion corrected image data, and
combining the motion corrected image data with non-motion corrected reconstructed image data of the subject reconstructed based on the second subset to generate final image data.

2. The system of claim 1 further comprising a three-dimensional (3D) imager, an optical camera, a radar camera, a visible structured-light 3D scanner, or a combination thereof that acquires the localizer image.

3. The system of claim 1 wherein the processor is operative with the computer readable program code to identify the one or more anatomical ranges by identifying multiple regions of interest where multiple types of periodic and non-periodic motion are expected.

4. The system of claim 1 wherein the processor is operative with the computer readable program code to identify the one or more anatomical ranges in the localizer image by performing a learning-based algorithm.

5. The system of claim 1 wherein the processor is operative with the computer readable program code to perform the image reconstruction with motion correction by extracting motion information from one or more first subsets of the medical image data within the one or more anatomical ranges and performing image reconstruction based on the motion information to generate the motion corrected image data.

6. A motion correction method, comprising:
 selecting, prior to acquisition of a localizer image of a subject, one or more regions of interest where motion is expected;
 identifying one or more anatomical ranges that coincide with the one or more regions of interest in the localizer image;
 acquiring a set of medical image data of the subject and dividing the set of medical image data into first and second subsets, wherein the first subset includes only medical image data within the one or more anatomical ranges and the second subset includes only medical image data outside the one or more anatomical ranges,
 performing image reconstruction with motion correction based on the first subset to generate motion corrected image data; and
 combining the motion corrected image data with non-motion corrected image data reconstructed based on the second subset to generate final image data.

7. The method of claim 6 wherein identifying the one or more anatomical ranges in the localizer image comprises identifying the one or more regions of interest for respiratory motion.

8. The method of claim 6 wherein identifying the one or more anatomical ranges in the localizer image comprises identifying the one or more regions of interest for cardiac motion.

9. The method of claim 6 wherein identifying the one or more anatomical ranges in the localizer image comprises identifying the one or more regions of interest for head motion.

10. The method of claim 6 wherein identifying the one or more anatomical ranges in the localizer image comprises performing a learning-based algorithm.

11. The method of claim 6 further comprising acquiring the set of medical image data of the subject using positron emission tomography (PET), high-resolution computed tomography (HRCT), magnetic resonance (MR) imaging, computed tomography (CT), helical CT, X-ray, angiography, fluoroscopy, ultrasound or single photon emission computed tomography (SPECT), or a combination thereof.

12. The method of claim 6 wherein performing the image reconstruction with motion correction comprises extracting motion information from the first subset and performing image reconstruction based on the motion information to generate the motion corrected image data.

13. The method of claim 12 wherein extracting the motion information comprises generating a respiratory signal, separating the first subset into gates using the respiratory signal, and determining a motion blurring kernel based on at least one of the gates.

14. The method of claim 13 wherein generating the respiratory signal comprises performing a data-driven respiratory gating technique to extract the respiratory signal from the first subset.

15. The method of claim 12 wherein performing image reconstruction comprises performing iterative image reconstruction or direct parametric reconstruction.

16. The method of claim 6 further comprising generating the non-motion corrected image data of the subject by performing image reconstruction without motion correction on the second subset.

17. The method of claim 16 wherein performing the image reconstruction without motion correction comprises performing an iterative reconstruction technique, an analytical method or a direct parametric reconstruction.

18. One or more non-transitory computer-readable media embodying instructions executable by a machine to perform operations for motion correction comprising:
 selecting, prior to acquisition of a localizer image of a subject, one or more regions of interest where motion is expected;
 identifying one or more anatomical ranges that coincide with the one or more regions of interest in localizer image;
 acquiring a set of medical image data of the subject and dividing the set of the medical image data of the subject into first and second subsets, wherein the first subset includes only medical image data within the one or more anatomical ranges, wherein the second subset includes only medical image data outside the one or more anatomical ranges;
 generating motion corrected image data based on the first subset of the medical image data;
 reconstructing non-motion corrected image data based on the second subset of the medical image data; and
 combining the motion corrected image data with the non-motion corrected image data to generate final image data.

19. The one or more non-transitory computer-readable media of claim 18 wherein identifying the one or more anatomical ranges in the localizer image comprises identifying the one or more regions of interest for respiratory motion, cardiac motion or head motion.

20. The one or more non-transitory computer-readable media of claim 18 wherein identifying the one or more anatomical ranges in the localizer image comprises identifying multiple regions of interest for multiple types of periodic and non-periodic motion.

* * * * *